US012151219B2

(12) United States Patent
Henius et al.

(10) Patent No.: US 12,151,219 B2
(45) Date of Patent: Nov. 26, 2024

(54) AERATING AND LIQUID AGITATING DEVICE

(71) Applicant: AEROMIXER, LLC, Medford, OR (US)

(72) Inventors: Doah Chase Henius, Medford, OR (US); Elijah Floyd Otter, Medford, OR (US)

( * ) Notice: Subject to any disclaimer, the term of this patent is extended or adjusted under 35 U.S.C. 154(b) by 520 days.

(21) Appl. No.: 16/174,335

(22) Filed: Oct. 30, 2018

(65) Prior Publication Data

US 2020/0030756 A1 Jan. 30, 2020

Related U.S. Application Data

(60) Provisional application No. 62/703,024, filed on Jul. 25, 2018.

(51) Int. Cl.

| | |
|---|---|
| ***B01F 25/31*** | (2022.01) |
| ***B01F 23/2326*** | (2022.01) |
| ***B01F 25/313*** | (2022.01) |
| *B01F 23/237* | (2022.01) |
| *B01F 101/00* | (2022.01) |

(52) U.S. Cl.

CPC ...... *B01F 25/3133* (2022.01); *B01F 23/2326* (2022.01); *B01F 23/237611* (2022.01); *B01F 2101/305* (2022.01)

(58) Field of Classification Search

CPC ............ B01F 2215/0052; B01F 3/0446; B01F 5/0461; B01F 2003/04872

See application file for complete search history.

(56) References Cited

U.S. PATENT DOCUMENTS 555,785 A * 3/1896 Misic et al. .............. F04F 1/18 417/108

3,012,676 A * 12/1961 Englesberg ............... E04H 4/12 D23/209

(Continued)

FOREIGN PATENT DOCUMENTS

DE 4206715 A1 * 9/1993 ............ B01F 3/0446

EP 1369386 A2 * 12/2003 ............ B01F 3/0446

OTHER PUBLICATIONS

EPO translation of DE 42 06 715 (Year: 1993).*

(Continued)

*Primary Examiner* — Stephen Hobson

(74) *Attorney, Agent, or Firm* — Jerry Haynes Law

(57) ABSTRACT

An aerating and liquid agitating device to efficiently introduce high velocity, agitating air into a water line for mixing and aerating water tanks. An illustrative embodiment of the aerating and liquid agitating device includes a device fitting having an ingress end configured to be coupled to a liquid pump, an egress end and an opening between the ingress end and the egress end. The device fitting may be configured to accommodate flow of a liquid from the ingress end to the egress end. An air inlet fitting may extend through the opening in the device fitting and terminate inside the device fitting. The air inlet fitting may be defined by a terminal angled profile sloped between from about 35° to about 90°. An air inlet hose may be coupled to the air inlet fitting. The air inlet hose may be configured to introduce air through the air inlet fitting into the device fitting.

17 Claims, 5 Drawing Sheets

(56) References Cited

U.S. PATENT DOCUMENTS 3,129,874 A * 4/1964 Mittelstaedt ............ F16L 41/02 417/151
3,234,880 A 2/1966 Hampton
3,282,226 A 11/1966 Repp
3,319,579 A 5/1967 Stack
3,340,819 A 9/1967 Allen
3,393,641 A 7/1968 Miedaner et al.
3,396,722 A * 8/1968 Lindberg, Jr. ....... A61H 33/027 4/492
3,444,821 A 5/1969 Wolsh
3,476,365 A * 11/1969 Agerley .................... F24F 6/06 261/80
3,541,616 A * 11/1970 Stricker ............... A61H 33/027 261/DIG. 75
3,606,166 A * 9/1971 Whear ................. A62C 35/605 239/542
3,825,286 A * 7/1974 Henry, III ............. F16L 41/023 285/38
4,132,838 A * 1/1979 Kreuer .............. B01F 25/31241 261/DIG. 26
4,261,347 A * 4/1981 Spencer, III ...... B01F 23/23121 4/492
4,333,833 A * 6/1982 Longley .................. C02F 1/686 423/DIG. 9
4,428,893 A * 1/1984 Cummings, Jr. ......... C02F 3/20 261/122.1
4,941,217 A * 7/1990 Tobias ............... A61H 33/6063 239/428
4,982,460 A * 1/1991 Tobias ............... A61H 33/6063 4/492
5,023,021 A * 6/1991 Conrad ................. B01F 25/312 261/76
5,091,118 A * 2/1992 Burgher .............. B01F 25/3131 261/76
5,167,878 A * 12/1992 Arbisi ................... B01F 23/454 261/37
5,277,250 A * 1/1994 Dela ......................... B05B 1/20 166/305.1
5,403,522 A * 4/1995 Von Berg .............. B01F 23/454 261/36.1
5,514,267 A * 5/1996 Machiya ................... C02F 1/24 261/36.1
5,920,924 A * 7/1999 Pinciaro ............... A61H 33/027 277/606
6,165,372 A * 12/2000 Ziemer ................. B01F 25/313 210/749
6,238,557 B1 * 5/2001 Ziemer ................. B01F 23/451 210/199
6,453,484 B1 * 9/2002 Pinciaro .................... F16L 5/10 4/541.6
6,896,851 B1 * 5/2005 Onizuka .............. B01D 53/504 422/231
6,986,506 B2 * 1/2006 Chapman ............ B01F 23/2326 261/76
7,137,569 B1 * 11/2006 Miller ................... B01F 25/313 239/599
7,156,377 B2 * 1/2007 Chapman ............ B01F 25/3121 96/204
7,416,171 B2 * 8/2008 Brice .................... B05B 7/0425 261/76
7,481,935 B2 * 1/2009 Olivier ...................... C02F 3/34 210/624
8,641,017 B2 * 2/2014 Aasen ................... B01F 25/314 261/76
8,882,001 B2 * 11/2014 Henry .................... A62C 13/66 261/DIG. 26
9,149,773 B2 * 10/2015 Brosten ............. B01F 23/23123
9,295,953 B2 * 3/2016 Linga ...................... C02F 1/683
9,308,505 B2 * 4/2016 Spears .................... B01F 33/45
9,458,707 B2 * 10/2016 Sanders ................ E21B 21/062
9,637,401 B1 * 5/2017 Sawicki ................ B01F 27/113
9,709,074 B2 * 7/2017 Burns ....................... F04F 1/18
RE46,708 E * 2/2018 Karamanos ............. F24F 13/30
10,029,219 B2 * 7/2018 Tamura ..................... C02F 1/24
10,052,596 B2 * 8/2018 Richardson ............... B08B 3/10
10,258,942 B2 * 4/2019 Kenreck, Jr. ..... B01F 25/31331
10,486,115 B2 * 11/2019 Roe ...................... B01F 23/454
10,591,231 B2 * 3/2020 Russell ................... F28F 23/00
2014/0056098 A1 * 2/2014 Das ........................... F28C 3/00 366/154.1
2016/0236160 A1 * 8/2016 Tamura ............. B01F 23/23105
2016/0263537 A1 * 9/2016 Kenreck, Jr. ....... B01F 25/3133
2017/0097163 A1 * 4/2017 Law ....................... B01D 53/75
2017/0203446 A1 * 7/2017 Dooley ................ H04N 23/631
2017/0227941 A1 * 8/2017 Chosokabe .............. F24F 11/58
2017/0238192 A1 * 8/2017 Lee ....................... H04W 16/24 455/500
2017/0246333 A1 * 8/2017 Carbone ................... A61L 9/12
2017/0257921 A1 * 9/2017 Ohue .................... G01J 5/0275
2018/0050937 A1 * 2/2018 Schroeder ............. B01F 25/314
2018/0167547 A1 * 6/2018 Casey ....................... G06T 7/11
2018/0252035 A1 * 9/2018 Casey ....................... E06B 9/68
2019/0275479 A1 * 9/2019 Jagers ................. B01F 25/4335
2019/0314874 A1 * 10/2019 Bodensteiner ........ B01F 25/312
2019/0336929 A1 * 11/2019 Toloza Porras .......... B01J 19/06

OTHER PUBLICATIONS

"Piping and plumbing fitting" Wikipedia published Jul. 24, 2016 accessed at <https://en.wikipedia.org/w/index.php?title=Piping_and_plumbing_fitting&oldid=731310334> (Year: 2016).*

* cited by examiner

AERATING AND LIQUID AGITATING DEVICE

CROSS-REFERENCE TO RELATED APPLICATIONS

This application claims the benefit of U.S. provisional application No. 62/703,024, filed Jul. 25, 2018 and entitled "AERATING AND LIQUID AGITATING DEVICE", which provisional application is hereby incorporated by reference herein in its entirety.

FIELD OF THE INVENTION

The present invention relates generally to an aerating and liquid agitating device that efficiently introduces high velocity, agitating air into a liquid-conveying line such as for the purpose of mixing and aerating solids and liquids in liquid tanks. More so, the present invention relates to an aerating and liquid agitating device that may introduce high velocity air into a liquid-conveying line downstream of a liquid pump and may utilize a male threaded reducer that couples to the liquid pump and a device fitting which communicates with the male threaded reducer and may reduce in diameter by about 10% to about 40%, or from about 1.5" to about 1.25", for example and without limitation, from the male threaded reducer to the device fitting such that the flow pressure of liquid in the liquid-conveying line is increased. An air inlet fitting may extend through an opening in the sidewall and into the device fitting and may protrude typically substantially more than about ¾ of the way across the interior width or diameter of the device fitting. The air inlet fitting may have a terminal angled profile of between about 35° and about 90° in the device fitting to facilitate greatly increased injection of air into the liquid-carrying line due to enhanced surface area for the flowing liquid to create vacuum pressure at the air inlet fitting in the device fitting. An air intake hose may be coupled to the air inlet fitting to distribute air from an air source into the air inlet fitting.

BRIEF DESCRIPTION OF THE DRAWINGS

The invention will now be described, by way of example, with reference to the accompanying drawings, in which:

FIG. 6 illustrates a longitudinal sectional view of the device fitting and the air inlet fitting terminating inside the device fitting.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1:
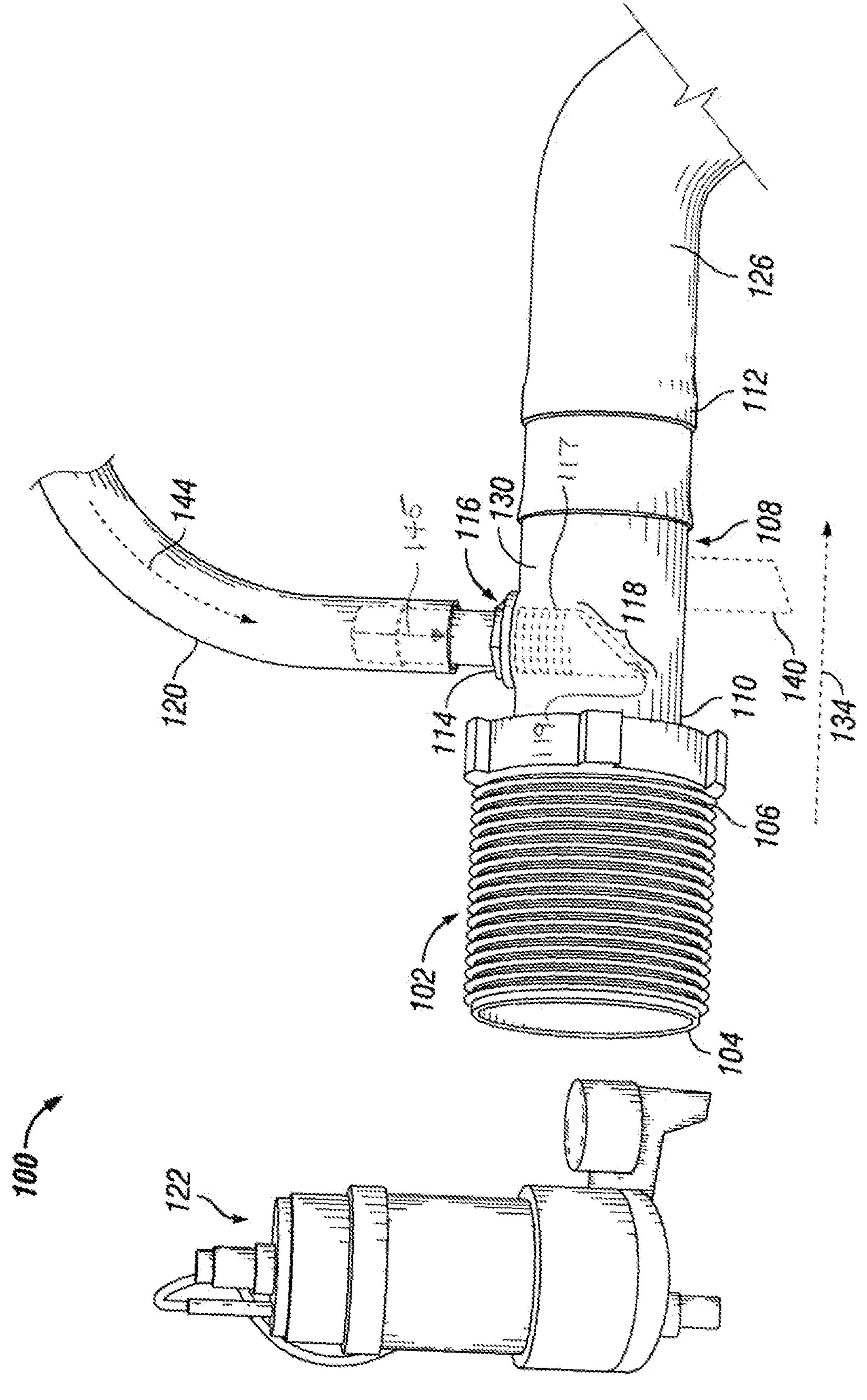
FIG. 1 illustrates a perspective view of an aerating and liquid agitating device in accordance with an illustrative embodiment of the present invention, with the device coupled to a liquid pump and a liquid-conveying line coupled to the device in typical application of the device.

An illustrative embodiment of an aerating and liquid agitating device 100 is referenced in FIGs. 1-6. As illustrated in FIG. 1, the aerating and liquid agitating device 100, hereafter "device 100", may include a device fitting 108 which may be suitably configured to be coupled to a liquid pump 122 typically as will be hereinafter described. A liquid-conveying line 126 may be suitably configured to be coupled to the device fitting 108. The device 100 may efficiently introduce high velocity, liquid-agitating air 144 into the liquid-conveying line 126 to mix and aerate water or other liquid 134 in a liquid- containing tank or other vessel or volume (not illustrated) which may be coupled to or otherwise communicate with the liquid-conveying line 126. The device 100 may introduce the high-velocity air 144 into the liquid-conveying line 126 downstream from the liquid pump 122 and may leverage one or more reductions in width or diameter in the fluid flow path to increase flow pressure of the liquid 134 as it flows through the liquid-conveying line 126.

The device 100 may also include an air inlet fitting 116 that may extend into and typically across greater than about ⅔ of an interior width or diameter of the device fitting 108. The air inlet fitting 116 may have a terminal angled profile 118 which may be sloped between from about 35° to about 90°. As illustrated in FIG. 6, the terminal angled profile 118 of the device fitting 108 may have an air inlet fitting opening 128 through which the air 144 is discharged from the air inlet fitting 116 into the device fitting 108 and which and may further face faces the downstream direction with respect to flow of the liquid 134 from the liquid pump 122 through the device fitting 108 and the liquid-conveying line 126. Accordingly, as illustrated in FIGS. 1 and 6, the air inlet fitting opening 128 of the air inlet fitting 116 may traverse a fraction of the entire width of the device fitting 108. The length of extension of the air inlet fitting 116 into the device fitting 108, the comparatively extreme angle of the terminal angled profile 118 of the air inlet fitting 116, and the typically downstream orientation of the air inlet fitting 116 in the device fitting 108 may create a synergy that greatly increases injection of the air 144 into the liquid-conveying line 126 due to more surface area across which the flowing liquid 134 creates vacuum pressure in the device fitting 108 typically at the terminal angled profile 118 of the air inlet fitting 116.

Figure 5:
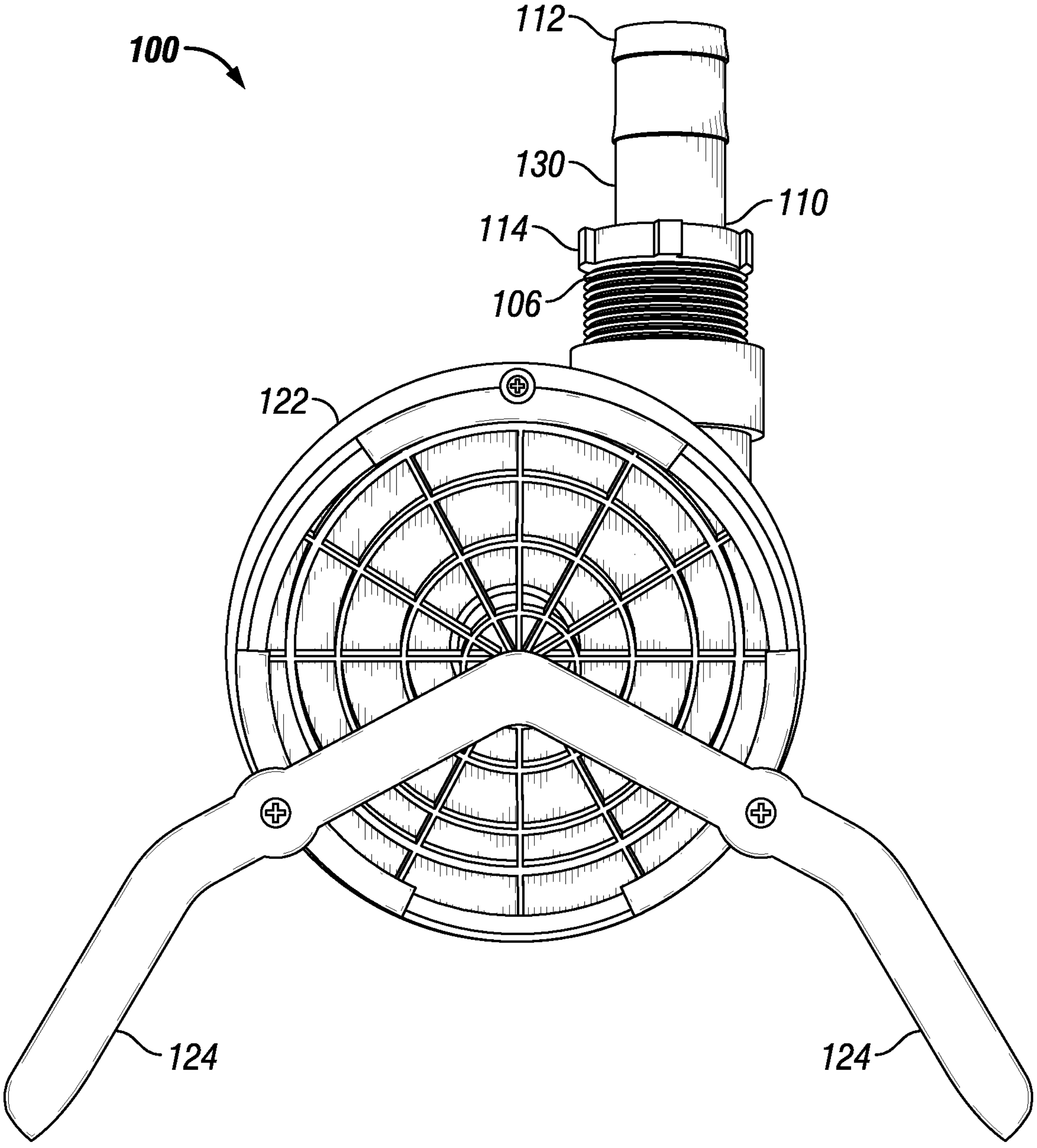
FIG. 5 illustrates a rear view of the aerating and liquid agitating device coupled to a liquid pump, with a pair of stabilizing arms on the liquid pump

Thus, in some applications, the device 100 may introduce the air 144 into a liquid 134 flowing into a nutrient tank 136 (FIG. 2) to keep the nutrient tank 136 fully mixed. In some applications, the liquid-conveying line 126 may be omitted and the pump 122 and the device 100 may be immersed in the liquid 134 in the nutrient tank 136, as illustrated. In other applications, the nutrient tank 136 may be coupled to the liquid-conveying line 126. In one exemplary use, the device 100 can aerate and mix a nutrient tank using one liquid pump 122 because of the design of the device fitting 108. As illustrated in FIG. 5, in some embodiments, at least one pump stabilizing arm 124 may be provided on the liquid pump 122 to facilitate mounting the liquid pump 122 in the nutrient tank 136.

In one aspect, the aerating and liquid agitating device 100 may include:

a male threaded reducer 102 defined by a pump end 104 and a tank end 106, the pump end 104 being operable to couple to a liquid pump 122, whereby pumped water flows from the pump end 104 to the tank end 106;

a device fitting 108 defined by an ingress end 110, an egress end 112, and an opening 114 between the ingress end 110 and the egress end 112, the ingress end 110, the tank end 106 of the male threaded reducer 102, and the egress end 112 all typically forming a molded one-piece unit, whereby a typical reduction in diameter from the tank end 106 of the male threaded reducer 102 to the ingress end 110 of the device fitting 108 increases flow pressure of the liquid 134 from the male threaded reducer 102 to the device fitting 108;

an air inlet fitting 116 extending through the opening 114 and terminating inside the device fitting 108, the air inlet fitting 116 defined by a terminal angled profile 118 sloped between from about 35° to about 90° and typically facing downstream of the flow of the liquid 134 through the device fitting 108;

an air inlet hose 120 coupled to the air inlet fitting 116, the air inlet hose 120 introducing air 144 through the air inlet fitting 116 into the device fitting 108, whereby the air inlet fitting 116 in the device fitting 108 creates a straight-in airline, so as to increase flow of the air 144 from the air inlet hose 120, through the air inlet fitting 116 and into the device fitting 108, whereby injection of the air 144 into the device fitting 108 increases due to more surface area for the liquid to create vacuum pressure in the device fitting 108 typically at the air inlet fitting 116; and at least one stabilizing arm 140 engaged with the device fitting 108 for support of the device 100.

In another aspect, the width or diameter of the male threaded reducer 102 may be about 1.5".

In some embodiments, the device fitting 108 may undergo a reduction in diameter of from about 10% to about 40% from the ingress end 110 to the egress end 112. In another aspect, the device fitting 108 may undergo a 20% reduction in width or diameter from the ingress end 110 to the egress end 112. In some embodiments, the device fitting 108 may be a one-piece molded construction. The device fitting 108 may be fabricated in different sizes ranging from about 1.5" to about 1.25", or from about 2" to about 1.6", for example and without limitation.

In another aspect, the air inlet hose 120 may include a food grade hose.

One objective of the present invention is to provide an aerating and liquid agitating device 100 that efficiently introduces high velocity, agitating air 144 into a liquid-conveying line 126 typically for mixing and aerating liquid tanks.

Another objective is to use a volumetric reduction method to increase pressure of air 144 flowing from the air inlet hose 120, through the air inlet fitting 116 into the device fitting 108.

Yet another objective is to utilize a more extreme angle that is greater than the standard or conventional 45° for the terminal angled profile 118 of the air inlet fitting 116, the terminal angled profile 118 being typically between from about 35° to about 90°, so as to greatly increase injection of air 144 into the device fitting 108 due to more surface area for the liquid 134 to create vacuum pressure typically at the angled profile 118 of the air inlet fitting 116.

Yet another objective is to keep solids suspended in solution (fertilizers in water).

Yet another objective is to utilize any length of flexible tubing as the liquid-conveying line 126 coupled to the egress end 112 of the device fitting 108 for use in extreme depths when the device fitting 108 is attached to the appropriate liquid pump 122.

Yet another objective is to eliminate the need for air stones and mixing pumps, by providing an all-in-one mixing unit.

Yet another objective is to stabilize pH in water.

Yet another objective is to alleviate sediment buildup in a fertilizer tank by increasing turbulence therein.

Yet another objective is to provide an aerating and liquid agitating device 100 that may operate independently of plumbing fixtures and external water lines.

As referenced in FIG. 1, the device 100 may include a male threaded reducer 102 that may facilitate threaded coupling of the device 100 to the liquid pump 122. The male threaded reducer 102 may have a pump end 104 and a tank end 106. The pump end 104 may be operable to couple to the liquid pump 122. In some embodiments, the liquid pump 122 may include a sump pump known in the art for removing overflow water from a cavity. The pumped liquid 134 may flow from the pump end 104, attached to the liquid pump 122, to the tank end 106 of the male threaded reducer 102. In some applications, the liquid pump 122 may be submerged under water or other liquid 134 and may not require connection of a line as it sits at the bottom of a tank such as a nutrient tank 136 (FIG. 2), for example and without limitation.

In some embodiments, the device 100 further may include a device fitting 108 which may have a sidewall 130 with an ingress end 110 and an egress end 112. An opening 114 may extend through the sidewall 130 between the ingress end 110 and the egress end 112. In some embodiments, the ingress end 110 may detachably couple to the tank end 106 of the male threaded reducer 102. In other embodiments, the ingress end 110 may be fabricated or formed in one piece with the tank end 106 of the male threaded reducer 102 according to the knowledge of those skilled in the art. In some embodiments, the device fitting 108 may have a lesser diameter than that of the male threaded reducer 102. This reduction in diameter may increase the flow pressure of the liquid 134 from the male threaded reducer 102 to the device fitting 108. Those skilled in the art will recognize that this reduction in diameter may increase the pressure of the liquid 134 at the air inlet fitting 116.

In some applications, the liquid-conveying conduit 126 may be coupled to the egress end 112 of the device fitting 108 using threads, couplings and/or other suitable coupling techniques known by those skilled in the art. In some applications, the egress end 112 of the device fitting 108 may be configured for attachment to a flexible liquid-conveying line 126. In some applications, the liquid pump 122 may be submerged in water or other liquid 134. The high velocity flow of the liquid 134 in the liquid-conveying line 126 may be effective to maintain solids suspended in solution, i.e., fertilizers in water, in the tank, vessel or other volume (not illustrated) connected to the liquid-conveying line 126.

In some embodiments, the liquid-conveying line 126 may include a flexible hose, although any type of hose, tubing, conduit, or reinforced hose may be used. Any length of flexible hose can be used at extreme depths when attached to the appropriate liquid pump 122 to allow aeration of the liquid 134 pumped by the liquid pump 122 at depth, for example. In some applications, the egress end 112 of the device fitting 108 may not be coupled to the liquid-conveying line 126. Accordingly, the tank, vessel or other liquid-containing volume (not illustrated) may be coupled to or otherwise disposed in fluid communication with the egress end 112 of the device fitting 108 according to the knowledge of those skilled in the art. In other applications, the device fitting 108 may be submerged in the liquid 134 in the tank, vessel or other liquid-containing volume, such as the nutrient tank 136 illustrated in FIG. 2. In some embodiments, the egress end 112 of the device fitting 108 may be barbed to facilitate attachment of a hose (typically under water) as the liquid-conveying line 126 to the device fitting 108. In some applications, however, a barbed egress end 112 of the device fitting 108 may not be necessary. The air inlet hose 120 may be any selected length to facilitate injection of the air 144 into the device fitting 108 at any selected depth.

As further illustrated in FIG. 1, in some embodiments, the device 100 may further include the air inlet fitting 116 that may extend through the opening 114 (FIG. 1) in the sidewall 130 of the device fitting 108 and extend across a substantial portion of the interior width or diameter of the device fitting 108 before terminating inside the device fitting 108. In some embodiments, the air inlet fitting 116 may extend across at least about ⅔ of the interior width or diameter of the device fitting 108. The position of the air inlet fitting 116 in the device fitting 108 may slightly restrict flow of the liquid 134 through the device fitting 108 but may also allow for a larger quantity of air 144 to be injected from the air inlet hose 120 through the air inlet fitting 116 into the device fitting 108. Further, the typical reduction in diameter from the tank end 106 of the male threaded reducer 102 to the ingress end 110 of the device fitting 108 may increase the pressure of the flowing liquid 134 at the air inlet fitting 116.

As further illustrated in FIG. 1, the air inlet fitting 116 may be defined by the terminal angled profile 118 which terminates in the device fitting 108. The terminal angled profile 118 may be sloped at from between about 35° and about 90°. Those skilled in the art will recognize that a 45°-angled profile is the industry standard. The comparatively extreme angled profile 118 of typically about 35°-90° for the air inlet fitting 116 may be oriented to face away from the incoming flow of the liquid 134 through the device fitting 108, downstream of the flow. The depth of the air inlet fitting 116 in the device fitting 108, the comparatively extreme angled profile 118 of the terminal end of the air inlet fitting 116, and the typical downstream-facing orientation of the air inlet fitting 116 may create a synergy that greatly increases injection of the air 144 from the air inlet hose 120 through the air inlet fitting 116 into the liquid 134 in the device fitting 108 by providing sufficient surface area for the liquid 134 to create vacuum pressure at the air inlet fitting 116 as the liquid 134 flows through the device fitting 108. Thus, in some applications, a fertilizer tank (not illustrated) may be coupled to the liquid-conveying line 126 opposite the device fitting 108. A primary objective of alleviating sediment buildup in the fertilizer tank by increasing turbulence therein may be accomplished by utilization of the device 100.

Figure 2:
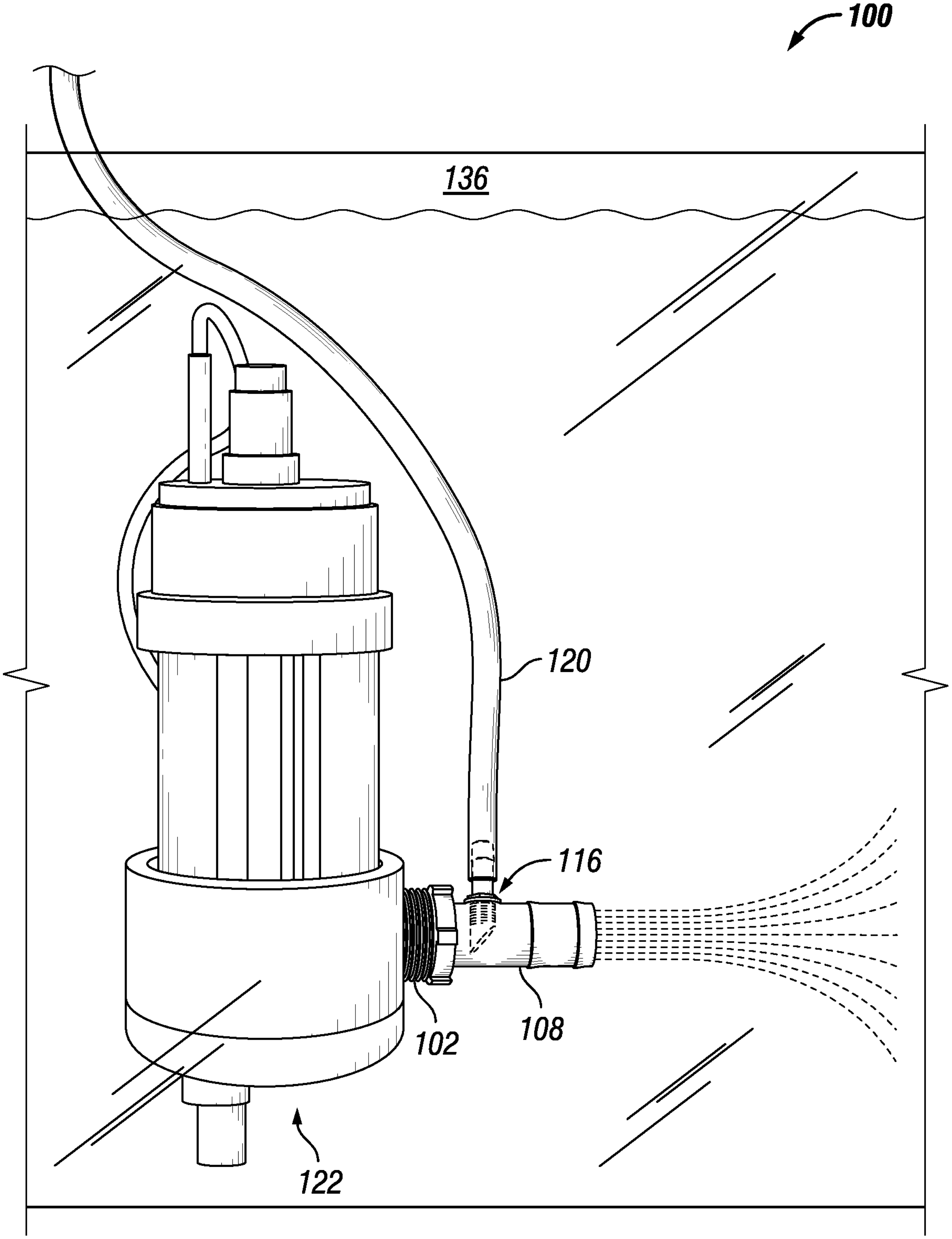
FIG. 2 illustrates a perspective view of the aerating and liquid agitating device aerating and mixing liquid in a nutrient tank using one liquid pump, in accordance with an illustrative embodiment of the present invention.
Figure 3:
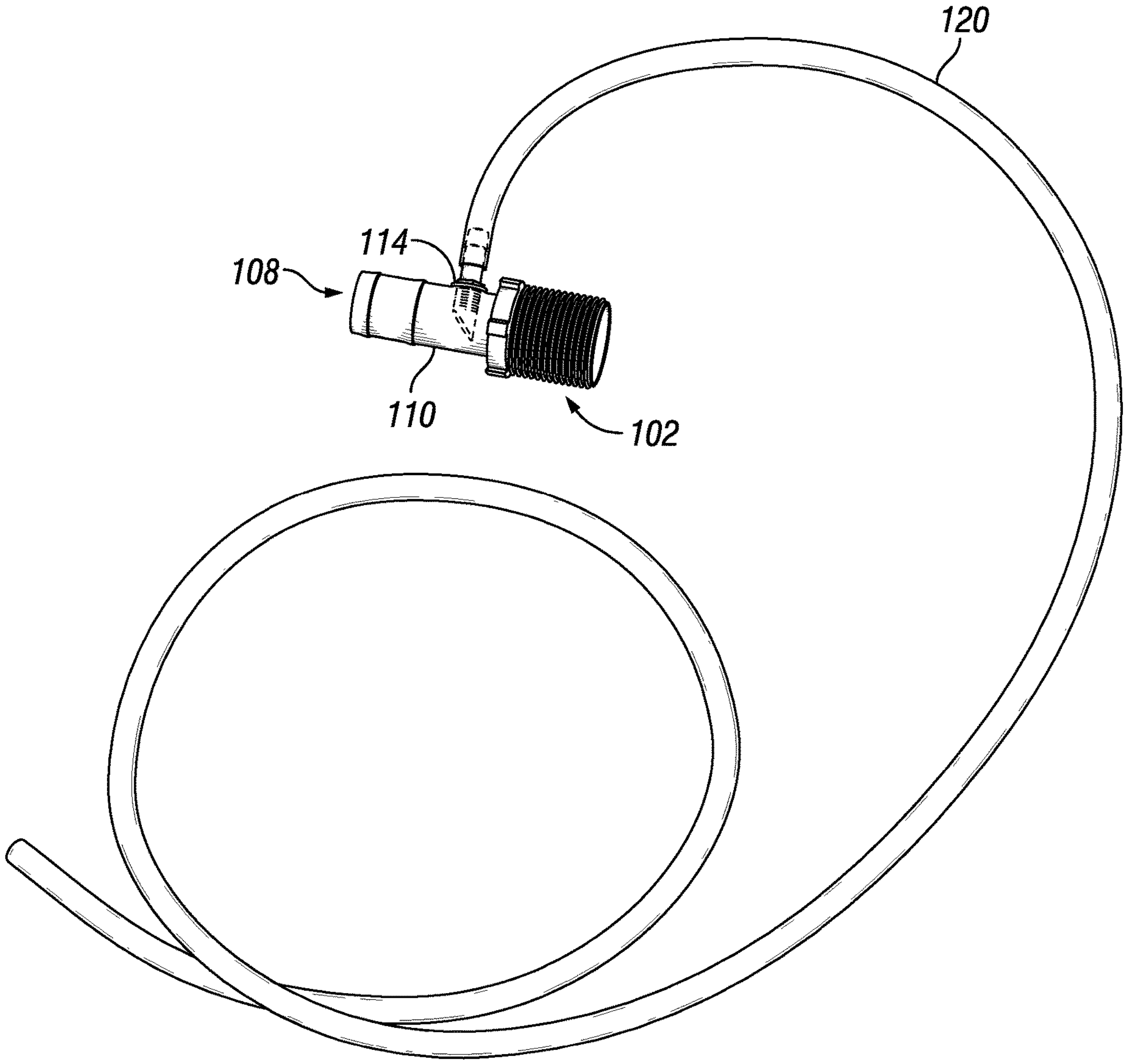
FIG. 3 illustrates a perspective view of an exemplary aerating and liquid agitating device and an air inlet hose coupled to the device, in accordance with an illustrative embodiment of the present invention.
Figure 4:
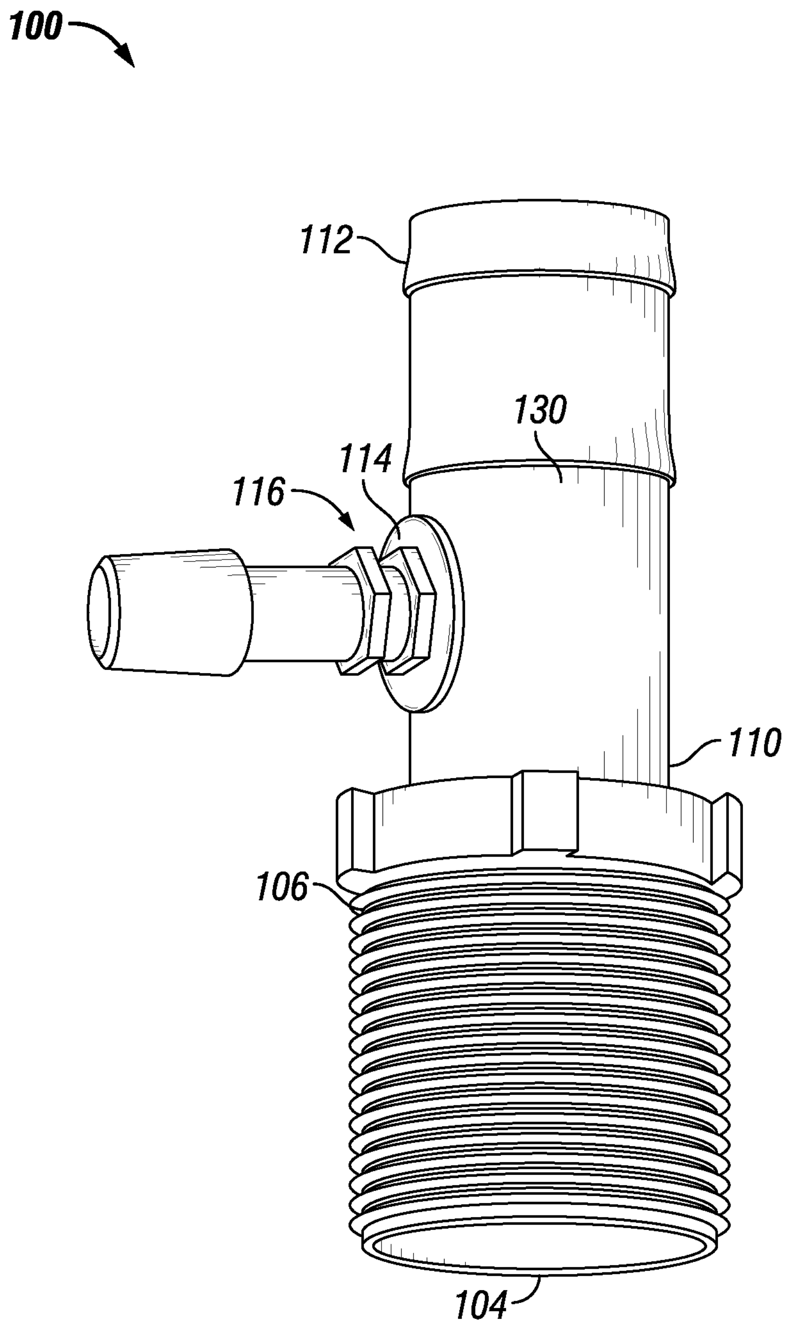
FIG. 4 illustrates an enlarged perspective view of an aerating and liquid agitating device in accordance with an illustrative embodiment of the present invention.

As shown in FIG. 3, the device 100 further may include the air inlet hose 120 that may couple to the air inlet fitting 116. The air inlet hose 120 may convey the air 144 from an air source (not illustrated) typically at the surface of the liquid 134 in which the liquid pump 122 is submerged to agitate the liquid 134 as it flows from the liquid pump 122 through the device fitting 108 and liquid-conveying line 126. For example, FIG. 2 illustrates a perspective view of the device 100 aerating and mixing a nutrient tank 136 with one liquid pump 122 and receiving air from the air inlet hose 120. As shown, the liquid pump 122 may sit in the nutrient tank 136 which holds the liquid 134 in which the liquid pump 122 is submerged and may require the inlet hose 120 to provide air injection. In this arrangement, the device 100 can aerate and mix the nutrient tank 136 with one liquid pump 122. The device 100 can thus pump 4,450 gallons of liquid per hour and may have the capability to accommodate ¼" solids in the liquid. In other embodiments, however, the air inlet fitting 116 could be attached to a 6,500 gallons per hour pump that moves ⅜" solids, for example.

The air inlet hose 120 may introduce the air 144 into the device fitting 108 through the aforementioned air inlet fitting 116. This interconnection between the air inlet hose 120 and the device fitting 108 may create a straight-in airline, which may increase flow of the air 144 through the air inlet hose 120. In some embodiments, the device 100 may include at least one stabilizing arm 140 (FIG. 1) which may engage the device fitting 108 to support the device 100 on a support structure (not illustrated). The stabilizing arm 140 may be provided at any point along the male threaded reducer 102 or the device fitting 108.

The device 100 may be easily coupled to the liquid pump 122 for operation typically by threading the male threaded reducer 102 into a companion, interiorly-threaded bore (not illustrated) in the liquid pump 122. The liquid pump 122 need not include projecting parts that require manipulation for coupling of the device 100 to the liquid pump 122. Further, the device 100 need not be attached to any plumbing system. In some applications, the device 100 may be an independent unit that may be used in water/fertilizer tanks and need not be installed in any permanent plumbing. In some applications, the device 100 may be installed in a hot tub to increase the bubbling effect therein.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An aerating and liquid agitating device suitable for introducing agitating air into a liquid to mix and aerate solids with the liquid, the device comprising:

a device fitting having an ingress end configured to be coupled to a liquid pump, an egress end and an opening between the ingress end and the egress end, the device fitting configured to accommodate flow of a liquid from the ingress end to the egress end, the device fitting having a sidewall forming a uniformly straight linear flow path for the liquid from the ingress end to the egress end;

an air inlet fitting having an inlet fitting wall extending through the opening in the device fitting and a terminal wall end terminating inside the device fitting, the inlet fitting wall having a straight linear shape to the terminal wall end, the inlet fitting wall disposed perpendicular to the flow of the liquid through the device fitting, the terminal wall end of the air inlet fitting defined by an open-ended terminal angled profile sloped between from about 45° to about 60° with respect to a pathway of air flow through the air inlet fitting, the terminal wall end with the terminal angled profile disposed at least about ⅔ across a diameter of the device fitting from the opening and terminating in spaced-apart relationship to the sidewall of the device fitting, the terminal wall end having an air inlet fitting opening and the terminal angled profile facing downstream of flow of the liquid, whereby the terminal angled profile and the air inlet fitting opening of the air inlet fitting have a length less than the diameter of the device fitting;

an air inlet hose coupled to the air inlet fitting, the air inlet hose configured to introduce air through the air inlet fitting into the device fitting; and a liquid tank disposed in fluid communication with the device fitting, the liquid tank suitably configured to suspend the solids in solution in the liquid as the agitating air mixes the solids with the liquid in the liquid tank.

2. The device of claim 1, further comprising a male threaded reducer disposed in fluid communication with the ingress end of the device fitting, the male threaded reducer configured for coupling with the liquid pump.

3. The device of claim 2, wherein the male threaded reducer has a pump end and a tank end, the pump end configured for coupling with the liquid pump and the tank end coupled to the ingress end of the device fitting.

4. The device of claim 3, further comprising a reduction in width or diameter from the tank end of the male threaded reducer to the ingress end of the device fitting, the reduction in diameter from the tank end of the male threaded reducer to the ingress end of the device fitting increases flow pressure of the liquid from the male threaded reducer to the device fitting.

5. The device of claim 1, further comprising a reduction in width or diameter from the ingress end to the egress end of the device fitting.

6. The device of claim 5, wherein the reduction in width or diameter from the ingress end to the egress end of the device fitting comprises about a 10%-40% reduction in width or diameter from the ingress end to the egress end of the device fitting.

7. An aerating and liquid agitating device suitable for introducing agitating air into a liquid to mix and aerate solids with the liquid, the device comprising:

a male threaded reducer defined by a pump end and a tank end, the pump end being operable to couple to a liquid pump, whereby pumped liquid flows from the pumped end to the tank end;

a device fitting defined by an ingress end, an egress end, and an opening between the ingress end and the egress end, the ingress end detachably coupled to the tank end of the male threaded reducer, the device fitting having a sidewall forming a uniformly straight linear flow path for the liquid from the ingress end to the egress end;

a reduction in width or diameter from the tank end of the male threaded reducer to the ingress end of the device fitting;

whereby the reduction in width or diameter from the tank end of the male threaded reducer to the ingress end of the device fitting increases flow pressure of the liquid from the male threaded reducer to the device fitting;

an air inlet fitting having an inlet fitting wall passing through the opening in the device fitting and having a terminal wall end terminating inside the device fitting, the inlet fitting wall having a straight linear shape to the terminal wall end, the inlet fitting wall disposed perpendicular to the flow of the liquid through the device fitting, the terminal wall end of the air inlet fitting defined by an open-ended terminal angled profile sloped between from about 45° to about 60° with respect to a pathway of air flow through the air inlet fitting and facing downstream of flow of the pumped liquid, the terminal wall end with the terminal angled profile disposed at least about ⅔ across a diameter of the device fitting from the opening and terminating in spaced-apart relationship to the sidewall of the device fitting, the terminal wall end having an air inlet fitting opening, whereby the terminal angled profile and the air inlet fitting opening of the air inlet fitting have a length less than the diameter of the device fitting;

an air inlet hose coupled to the air inlet fitting, the air inlet hose introducing air into the device fitting through the air inlet fitting;

whereby the air inlet fitting in the device fitting creates a straight-in airline, so as to increase flow of the air into the device fitting;

whereby injection of the air through the air inlet hose and the air inlet fitting into the device fitting increases due to vacuum pressure induced at the air inlet fitting; and a liquid tank disposed in fluid communication with the device fitting, the liquid tank suitably configured to suspend the solids in solution in the liquid as the agitating air mixes the solids with the liquid in the liquid tank.

8. The device of claim 7, wherein the device fitting is a one-piece unit.

9. The device of claim 7, wherein a width or diameter of the male threaded reducer is about 1.5".

10. The device of claim 7, wherein the air inlet hose is a food grade hose.

11. The device of claim 7, further comprising a reduction in width or diameter from the ingress end to the egress end of the device fitting.

12. The device of claim 11, wherein the reduction in width or diameter from the ingress end to the egress end of the device fitting comprises about a 10%-40% reduction in width or diameter from the ingress end to the egress end of the device fitting.

13. The device of claim 12, wherein the reduction in width or diameter from the ingress end to the egress end of the device fitting comprises about a 20% reduction in width or diameter from the ingress end to the egress end of the device fitting.

14. An aerating and liquid agitating device suitable for introducing agitating air into a liquid to mix and aerate solids with the liquid, the device comprising:

a male threaded reducer defined by a pump end and a tank end, the pump end being operable to couple to a liquid pump, whereby pumped liquid flows from the pumped end to the tank end;

a device fitting defined by an ingress end, an egress end, and an opening between the ingress end and the egress end, the ingress end detachably coupled to the tank end of the male threaded reducer, the device fitting having a sidewall forming a uniformly straight linear flow path for the liquid from the ingress end to the egress end;

about a 10% to 40% reduction in width or diameter from the ingress end to the egress end of the device fitting;

a reduction in width or diameter from the tank end of the male threaded reducer to the ingress end of the device fitting;

whereby the reduction in width or diameter from the ingress end to the egress end of the device fitting and the reduction in diameter from the tank end of the male threaded reducer to the ingress end of the device fitting increases flow pressure of the liquid from the male threaded reducer to the device fitting;

an air inlet fitting having an inlet fitting wall passing through the opening in the device fitting and a terminal wall end terminating inside the device fitting, the inlet fitting wall having a straight linear shape to the terminal wall end, the inlet fitting wall disposed perpendicular to the flow of the liquid through the device fitting, the terminal wall end of the air inlet fitting defined by an open-ended terminal angled profile sloped between from about 45° to about 60° with respect to a pathway of air flow through the air inlet fitting and facing downstream of the flow of the pumped liquid, the terminal wall end with the terminal angled profile disposed at least about ⅔ across a diameter of the device fitting from the opening and terminating in spaced-apart relationship to the sidewall of the device fitting, the terminal wall end having an air inlet fitting opening, whereby the terminal angled profile and the air inlet fitting opening of the air inlet fitting have a length less than the diameter of the device fitting;

an air inlet hose coupled to the air inlet fitting, the air inlet hose introducing air into the device fitting through the air inlet fitting;

whereby the air inlet fitting in the device fitting creates a straight-in airline, so as to increase flow of the air into the device fitting;

whereby injection of the air through the air inlet hose and the air inlet fitting into the device fitting increases due to vacuum pressure induced at the air inlet fitting;

at least one stabilizing arm engaged with the device fitting; and a liquid tank disposed in fluid communication with the device fitting, the liquid tank suitably configured to suspend the solids in solution in the liquid as the agitating air mixes the solids with the liquid in the liquid tank.

15. The device of claim 14, wherein the reduction in width or diameter from the ingress end to the egress end of the device fitting comprises about a 20% reduction in width or diameter from the ingress end to the egress end of the device fitting.

16. The device of claim 14, wherein a width or diameter of the male threaded reducer is about 1.5".

17. The device of claim 14, wherein the air inlet hose is a food grade hose.

* * * * *